United States Patent [19]

Lippert et al.

[11] Patent Number: 5,118,467
[45] Date of Patent: Jun. 2, 1992

[54] FUEL ASSEMBLY FOR A BOILING WATER REACTOR

[75] Inventors: Hans-Joachim Lippert, Höchstadt/Aisch; Roland Rink, Bad Königshofen; Walter Uebelhack, Niederhausen, all of Fed. Rep. of Germany

[73] Assignee: Siemens Aktiengesellschaft, Munich, Fed. Rep. of Germany

[21] Appl. No.: 619,900

[22] Filed: Nov. 28, 1990

[30] Foreign Application Priority Data

Nov. 29, 1989 [EP] European Pat. Off. ........ 89121995.8

[51] Int. Cl.⁵ .............................................. G21C 3/32
[52] U.S. Cl. .................................. 376/443; 376/444; 376/457; 376/448
[58] Field of Search ............. 376/443, 444, 448, 437, 376/457, 438

[56] References Cited

U.S. PATENT DOCUMENTS

| | | | |
|---|---|---|---|
| 4,666,664 | 5/1987 | Doshi | 376/261 |
| 4,749,543 | 6/1988 | Crowthier et al. | 376/443 |
| 4,970,047 | 11/1990 | Ueda et al. | 376/443 |
| 4,999,153 | 3/1991 | Johansson et al. | 376/443 |

FOREIGN PATENT DOCUMENTS

| | | |
|---|---|---|
| 89119178 | 10/1989 | European Pat. Off. |
| 0346657 | 12/1989 | European Pat. Off. |
| 3533317 | 3/1987 | Fed. Rep. of Germany |
| 8803061 | 5/1987 | Fed. Rep. of Germany |
| 2208749 | 4/1988 | United Kingdom |

Primary Examiner—Brooks H. Hunt
Assistant Examiner—Meena Chelliah
Attorney, Agent, or Firm—Herbert L. Lerner; Laurence A. Greenberg

[57] ABSTRACT

A fuel assembly for a boiling water reactor includes an elongated fuel assembly case, mutually parallel fuel rods having longitudinal axes and being disposed in the case, and longitudinally extending inner walls having lateral surfaces facing toward the fuel rods. At least some of the lateral surfaces have grooves formed therein extending perpendicular to the longitudinal axes of the fuel rods. A boiling water reactor includes a boiling water circuit having a pressure vessel and a steam turbine. A plurality of the fuel assemblies are disposed mutually parallel in the pressure vessel. The fuel rods are bathed by boiling water flowing around them in the longitudinal direction of the fuel rods.

15 Claims, 7 Drawing Sheets

FUEL ASSEMBLY FOR A BOILING WATER REACTOR

The invention relates to a fuel assembly for a boiling water reactor having mutually parallel fuel rods disposed in an elongated fuel assembly case, and inner walls extending longitudinally between the fuel rods. The invention also relates to a boiling water reactor having such a fuel assembly.

When constructing a fuel assembly, various and sometimes mutually contradictory conditions must be considered, in order to optimize the production and flow of thermal neutrons, to increase steam production at the active fuel rods, to assure adequate mechanical stability and corrosion resistance, and to preclude other factors, such as corrosion or thermal changes.

The fuel rods containing the nuclear fuel, such as uranium dioxide or uranium-plutonium mixed oxides, are held by mechanical fixtures that simultaneously provide guidance for the flow of water and steam and form the so-called skeleton of the fuel assemblies as well. The fuel rods are disposed longitudinally parallel to one another inside a fuel assembly case which extends longitudinally between a base part and a cap part and through which water flows. The water enters through openings in the base part, flows along the fuel rods as partial evaporation occurs, evaporates to a large extent on the hot surfaces of the rods, and emerges through outlet openings of the cap part in the form of a mixture of water and steam.

In order to attain high heat transmission with high boiling output and the most uniform possible cooling at the fuel rods, a flow with a pressure difference is maintained along the longitudinal axis of the case. To this end, suitable feed devices are provided in a closed water cycle or circuit extending from the outlet openings through a steam turbine to the inlet openings of the case. Non-boiling water for slowing down the neutrons and a controllable absorber for controlling the neutron balance are located outside the case. In order to keep the neutron absorption low within the active zone of the reactor, a special material, as a rule a zirconium alloy, is used at that location for the skeletal parts and in particular for the fuel assembly case. However, that material has little mechanical strength. The pressure difference between the interior and exterior of the case can therefore easily buckle the case.

In order to improve the neutron flow, some of the positions provided for the fuel rods in the interior of the case are often occupied by so-called "water rods", that is channels which are in the form of fuel rods, but which carry non-boiling water. Accordingly, the water channels are laterally closed off from the fuel rods by inner walls extending in the interior of the case, parallel to the fuel rods. It may be advantageous in such a case to place flow baffles in the intermediate spaces between the channels and the case walls in order to effect a uniform flow and to create turbulence in vapor bubbles and liquid droplets, so that the fuel rods are acted upon uniformly by water. In particular, the flow baffles may be attached to grid-like structures, which serve as spacers for the fuel rods.

In order to increase mechanical strength, Published European Application No. 89 119 176.9 proposes providing inner walls in the case that interconnect oppositely disposed case walls. In such a device it is advantageous if the inner walls are constructed as a unit along with the spacers, fuel rods and suitable fasteners for the fuel rods in the cap part and the base part. Such a unit is displaceable relative to the case wall so that the case can be removed from the fuel assembly for inspection.

In order to optimize the various requirements of a fuel assembly, U.S. Pat. No. 4,749,543 proposes a profile for the outer surfaces of the case that forms a reinforcing case wall at the corners of the square case and above all forms wall reinforcements in the lower part of the case that extend longitudinally and/or transversely. Due to the reinforcements, a relatively small wall thickness in the regions located between the reinforcements is then sufficient so that less neutron-absorbing material is needed overall for the case.

Additionally, grooves which extend at right angles to the flow direction are milled into the inner surfaces of the case walls and lead to an enlargement of the flow cross section and therefore counteract an elevated pressure resulting from the increase in volume during evaporation. The upper edge of a groove is constructed as a narrow surface at right angles to the flow direction so that a film of water creeping along the wall is detached there and steered into the interior of the case. Such a structure is known as a "flow tripper".

It is accordingly an object of the invention to provide a fuel assembly for a boiling water reactor, which overcomes the hereinafore-mentioned disadvantages of the heretofore-known devices of this general type and which increases the boiling capacity or output of the fuel assembly in a boiling water reactor.

The invention assumes that according to a variant of the invention the flow of thermal neutrons is increased, above all in the upper region of the fuel assembly, by means of inner walls that laterally define a channel carrying non-boiling water with respect to the fuel rods. There, the fuel rods are largely surrounded by water vapor, which can only inadequately slow down the neutrons produced in the decomposition. In these channels, which do not contain any fuel rods, a suitable flow cross section and flow speed assure that the convective heat entering through the channel wall is dissipated without causing the formation of steam in the channels. The non-boiling water in these channels therefore improves the distribution of the thermal neutrons. However, this leads to an increased heating capacity or output in the upper part of the fuel assembly only if sufficient water for evaporation is supplied to the fuel rods at that location as well.

Furthermore, the supply of liquid water to the fuel rods is made more difficult by the fact that a considerable portion of the water entering the base of the fuel assembly forms a film of liquid on the channel walls and therefore does not come into contact with the fuel rods. According to this variant, at least in the aforementioned upper part of the fuel assembly, grooves are therefore provided on the surfaces of the inner walls forming the water channels that are oriented toward the fuel assemblies. The grooves extend transversely to the rods, or in other words transversely to the flow direction.

However, the neutron flow can also be increased by providing that the thickness of the case walls is reduced, and thus the total quantity of neutron absorbing material is decreased. In order to assure adequate stability of the case walls even with a low wall thickness, another variant of the invention accordingly provides inner walls that interconnect oppositely disposed case wall parts. However, a film of liquid forms on these reinforcing inner walls as well, and as a result the percentage of water that can come into contact with the fuel rods in liquid form is reduced in the upper part of the fuel assembly that carries steam. Suitable grooves in these reinforcing walls cause a liquid film creeping along them to detach or break away and become swirled together with the mixture of water and steam flowing past it in such a way that once again the boiling capacity or output of the fuel assembly is increased.

With the foregoing and other objects in view there is provided, in accordance with the invention, a fuel assembly for a boiling water reactor, comprising an elongated fuel assembly case, mutually parallel fuel rods having longitudinal axes and being disposed in the case, and longitudinally extending inner walls between the fuel rods having lateral surfaces facing or oriented toward the fuel rods, at least some of the lateral surfaces having grooves formed therein extending perpendicular to the longitudinal axes of the fuel rods.

In accordance with another feature of the invention, the inner walls form at least one water channel for non-boiling water being laterally closed off from the fuel rods.

In accordance with a further feature of the invention, the grooves extend continuously around the outside of the water channel.

In accordance with an added feature of the invention, the lateral surfaces with the grooves are planar outer surfaces of the water channel.

In accordance with an additional feature of the invention, the case has mutually opposite walls, a plurality of the inner walls interconnect at least two of the mutually opposite walls, and the inner walls each have two of the lateral surfaces in which the grooves are formed.

In accordance with yet another feature of the invention, the inner walls have sides being parallel to the longitudinal axes of the fuel rods, and the grooves formed in one of the lateral surfaces each extend as far as the sides of the inner walls.

In accordance with yet a further feature of the invention, the inner walls have sides being parallel to the longitudinal axes of the fuel rods, and the grooves formed in one of the inner walls end in a rounded portion at a distance from the sides of the inner walls.

In accordance with yet an added feature of the invention, the case has a polygonal and preferably square cross section and oppositely disposed side walls, a plurality of the inner walls are parallel to the oppositely disposed side walls of the case, each of the inner walls interconnect two respective oppositely disposed side walls of the case, and the grooves are formed in all of the lateral surfaces facing toward the fuel rods.

In accordance with yet an additional feature of the invention, the case has a regular polygonal and preferably square cross section and side walls, the inner walls include a first group of inner walls forming a water channel for non-boiling water extending at least approximately centrally in the case and being laterally closed off from the fuel rods, and a second group of inner walls connecting each of the side walls of the case to the water channel, and at least the second group of inner walls has the grooves formed in all of the surfaces facing toward the fuel rods.

In accordance with again another feature of the invention, the grooves have narrow sides perpendicular to the longitudinal axes of the fuel rods.

In accordance with a concomitant feature of the invention, the case has a lower end with a base having inlet openings for boiling water, an upper portion with a top part having outlet openings for boiling water, and a plurality of spacers being longitudinally spaced apart from one another and having ribs between the fuel rods extending transversely to the longitudinal axes of the fuel rods, the grooves being formed only in the upper portion and each of the grooves being upstream of a respective one of the spacers, as seen in flow direction of boiling water.

With the objects of the invention in view, there is also provided a boiling water reactor, comprising a boiling water circuit having a pressure vessel and a steam turbine, and a plurality of mutually parallel fuel assemblies disposed in the pressure vessel, each of the fuel assemblies including an elongated fuel assembly case, mutually parallel fuel rods having longitudinal axes and being disposed in the case, and longitudinally extending inner walls having lateral surfaces facing toward the fuel rods, the lateral surfaces having grooves formed therein extending perpendicular to the longitudinal axes of the fuel rods, and the fuel rods being bathed by boiling water flowing around them in the longitudinal direction of the fuel rods.

Other features which are considered as characteristic for the invention are set forth in the appended claims.

Although the invention is illustrated and described herein as embodied in a fuel assembly for a boiling water reactor, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawing.

Figures 1, 2:
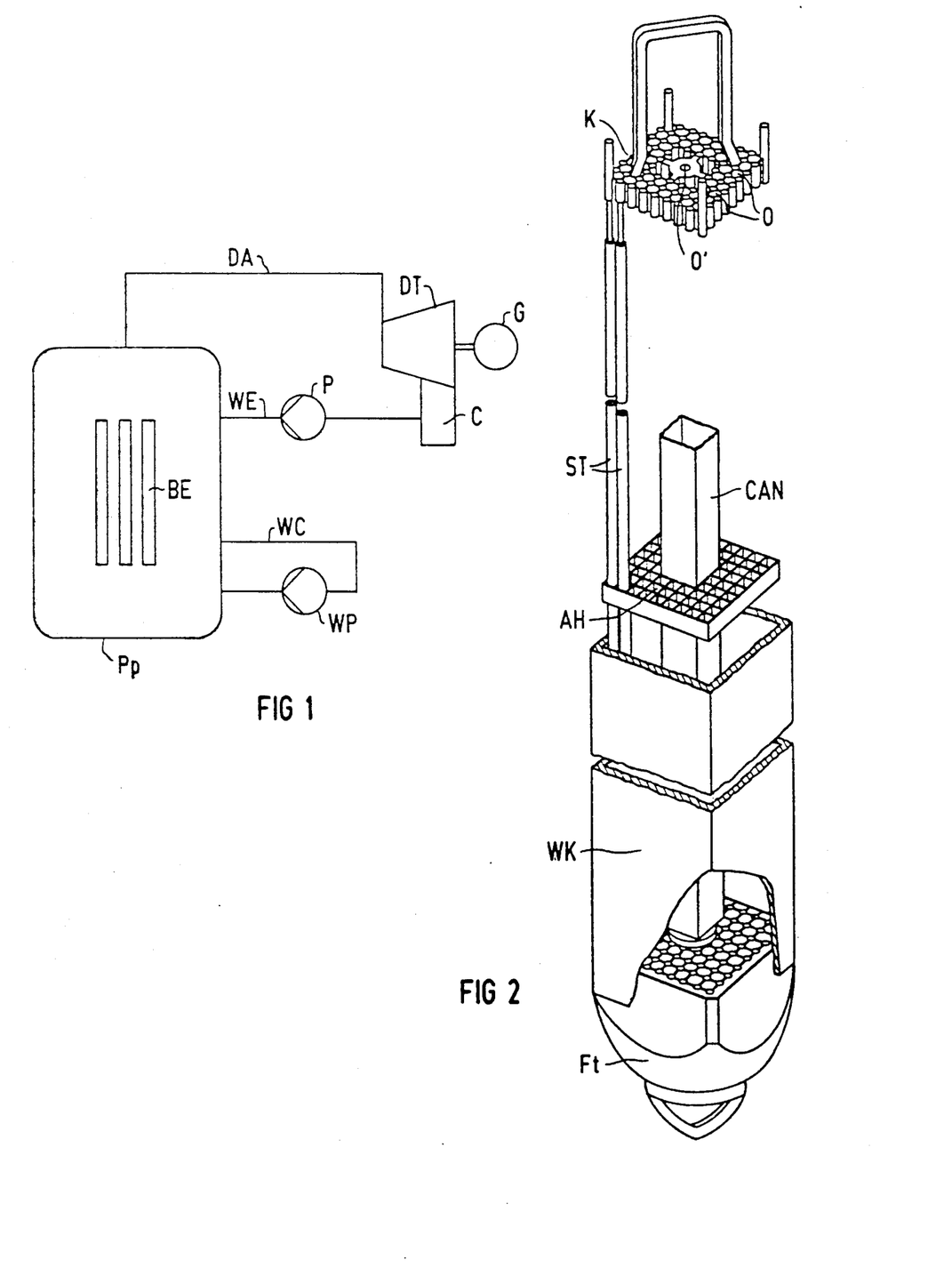
FIG. 1 is a schematic circuit diagram illustrating the principle of a boiling water reactor.
FIG. 2 is a fragmentary, diagrammatic and partly broken-away perspective view of a structure of a fuel assembly.

Referring now to the figures of the drawing in detail and first, particularly, to FIG. 1 thereof, there is seen a boiling water nuclear reactor having a pressure vessel Pp, in which a reactor core with vertically oriented fuel assemblies BE is disposed. A steam outlet line DA leads to a steam turbine DT, which drives a generator G. Water condensed in a condenser C is delivered through a feed water pump P to a water input line WE of the pressure vessel.

Unevaporated water in the fuel assemblies is also recirculated through a water cycle or circuit WC and a coolant pump WP.

The fuel assemblies BE located in the pressure vessel contain vertically disposed rods ST shown in FIG. 2, which are held at the bottom in a base Ft and at the top in a cap or head part K and are laterally surrounded by a water case, box or duct WK. The cap part K has outlet openings O for a water/steam mixture, which are connected through other non-illustrated components, such as for drying the steam, in a closed cycle or circuit with the steam turbine DT. Corresponding inlet openings on the base part cannot be seen.

The fuel rods are fixed in the case by spacers AH, which extend transversely between the fuel rods. While FIG. 2 shows only one spacer, normally from 5 to 7 such spacers are disposed in succession in the case, at approximately equal intervals.

A water channel or duct CAN for non-boiling water preferably extends longitudinally relative to the case and is connected to the cycle or circuit of the pumps P and WP through corresponding inlet openings in the base Ft and a corresponding outlet opening O' in the cap K.

Figure 3:
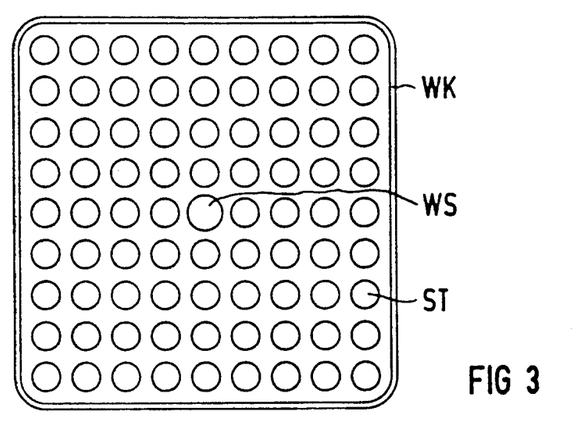
FIGS. 3–5 are enlarged cross-sectional views of a fuel assembly with inner walls forming channels.

In the cross section through the water case WK shown in FIG. 3, the fuel assemblies are disposed in the meshes or mesh openings of a regular, rectangular grid that has 9 · 9 positions for the fuel rods ST. However, instead of a fuel rod, the center of the fuel assembly has a water channel or duct, which is a so-called "water rod" WS and in this instance is formed of a tubular inner wall in the case.

Figure 4:
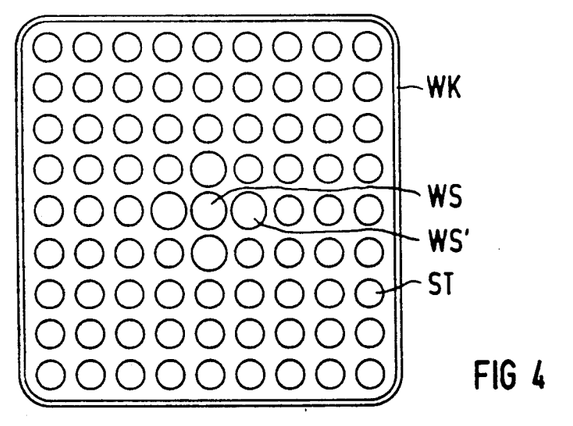

In FIG. 4, the water case WK, for which a polygonal cross section has advantageously been selected, also has a square cross section. In this instance, however, a plurality of inner walls have been provided with corresponding water rods WS, WS'. In this case, only 9 · 9 − 5 positions for the fuel rods ST remain.

Figure 5:
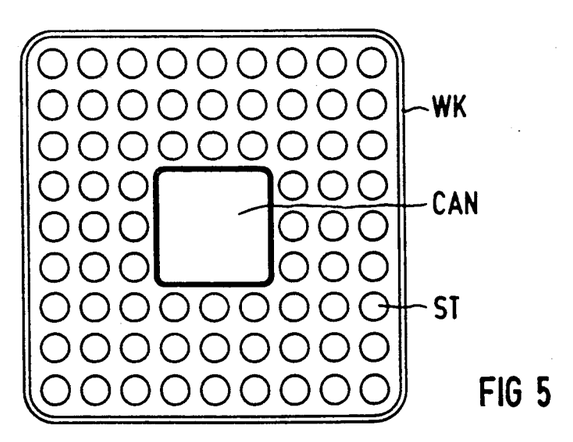

A water channel CAN having the square cross section already shown in FIG. 2 has proved to be particularly advantageous. In FIG. 5, 9 · 9 − 9 fuel rods ST can be accommodated with the water channel CAN.

Figure 6:
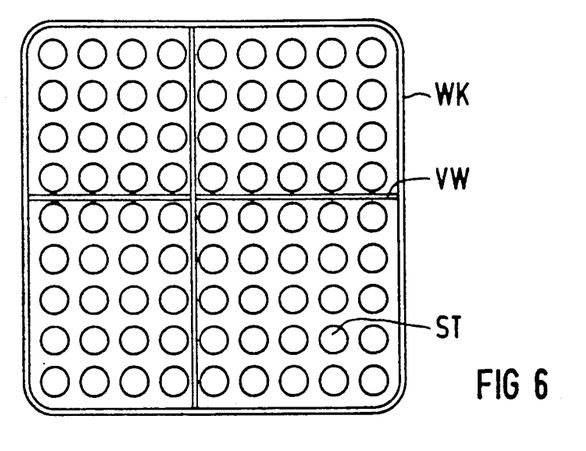
FIG. 6 is a cross-sectional view of a fuel assembly having inner walls forming reinforcements.

FIG. 6 shows a different preferred embodiment, in which opposed walls of the case are joined to one another by inner walls, that are each parallel to case walls if a polygonal cross section is used. In the quadratic form of FIG. 6, the result is a cross-shaped structure of reinforcing inner walls VW. Such reinforcing inner walls VW allow the fuel assembly to have a high feed pressure for the water, with an increased flow speed which can thus lead to increased steam production, despite relatively thin case walls WK. In order to compensate for pressure differences in the various quadrants of the case, perforations or other openings may be provided in the reinforcing walls VW, which extend longitudinally over practically the entire length of the case.

Figure 7:
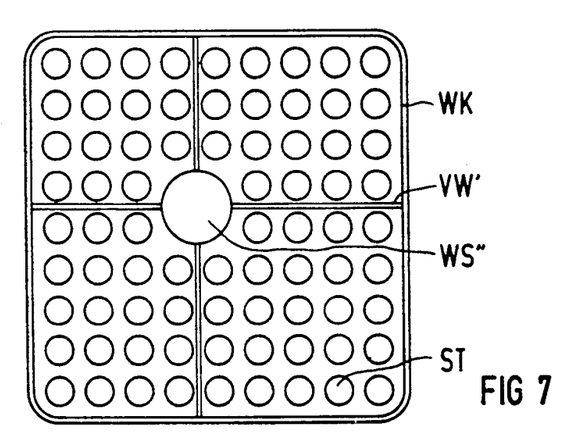
FIGS. 7 and 8 are cross-sectional views of channels with reinforcing walls and channel walls.

In the cross section of FIG. 7 as well, inner walls are provided in the interior of the case, but some of them form a water rod WS'', which in this instance is relatively large, while some are constructed as reinforcing walls VW'', which join the opposed case walls together through the water rod. In contrast to FIGS. 3–5, the water channel formed by the water rod WS'' is not disposed strictly centrally within the case but rather is shifted somewhat to the side.

Figure 8:
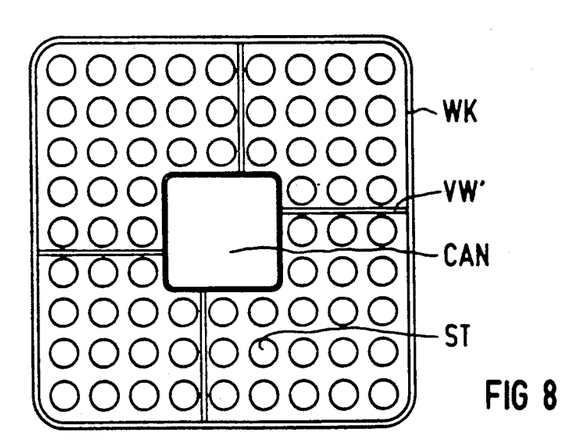

FIG. 8 shows a central water channel CAN formed by some of the inner walls, which is joined to the case walls through another group of inner walls that serve as reinforcing walls VW'', as in FIG. 7.

Figure 9:
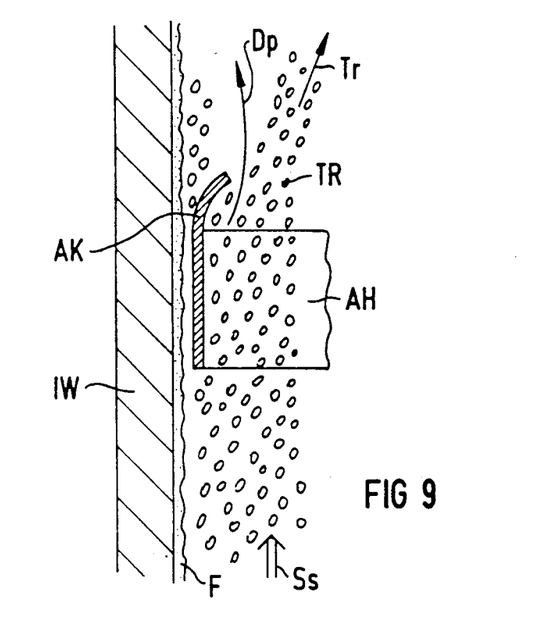
FIGS. 9 and 10 are further enlarged, fragmentary, longitudinal-sectional views illustrating the influence of grooves on the flow of water vapor and water droplets along a wall.

In FIG. 9 an inner wall IW, which may be the wall of the channels or water rods or a reinforcing wall, is shown in a longitudinal section. An arrow SS indicates the flow direction in which the water in the lower portion of the fuel assembly, and a mixture of water vapor and water droplets in the upper portion, flow along the lateral surface of the inner wall IW facing toward the fuel rods. No evaporation takes place at the inner wall IW, which protrudes out of the ler lower portion of the fuel assembly into the upper, steam-carrying space of the fuel assembly and optionally is additionally cooled by the non-boiling water flowing in the channels. Instead, water creeps upward along the inner wall IW in the form of a film F.

A rib of the spacer AH which is shown in FIG. 9 has a long side with an edge AK that is constructed as a flow baffle and protrudes into the steam flow in such a way that droplets TR contained in the flow are diverted from their horizontal flow direction and spun into the direction of the fuel assemblies. The result is a partial separation of a droplet flow Tr from the water vapor flowing in the direction of an arrow Dp, and more liquid water being supplied to the fuel rods.

Figure 10:
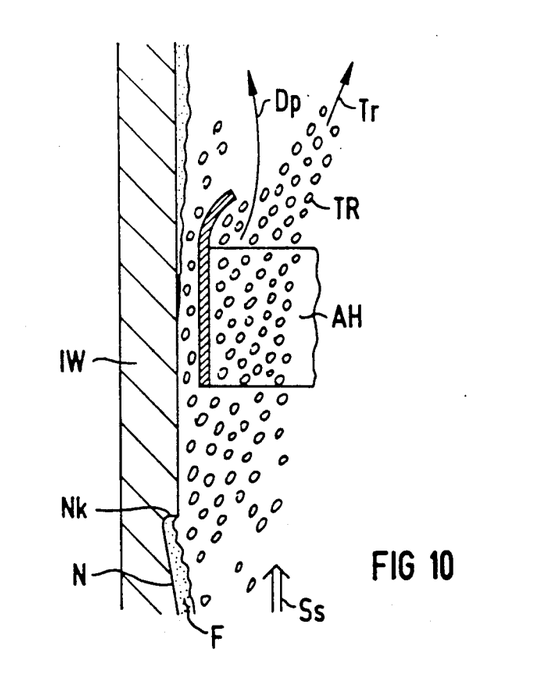

This separation action is increased if the spacers AH, or the edges AK thereof that are formed into baffles, are preceded in the flow direction by the grooves N according to the invention as seen in FIG. 10. The grooves N act as "flow trippers" for the liquid film. The grooves N preferably have edges with narrow surfaces Nk, which are at right angles to the flow direction.

Figure 11:
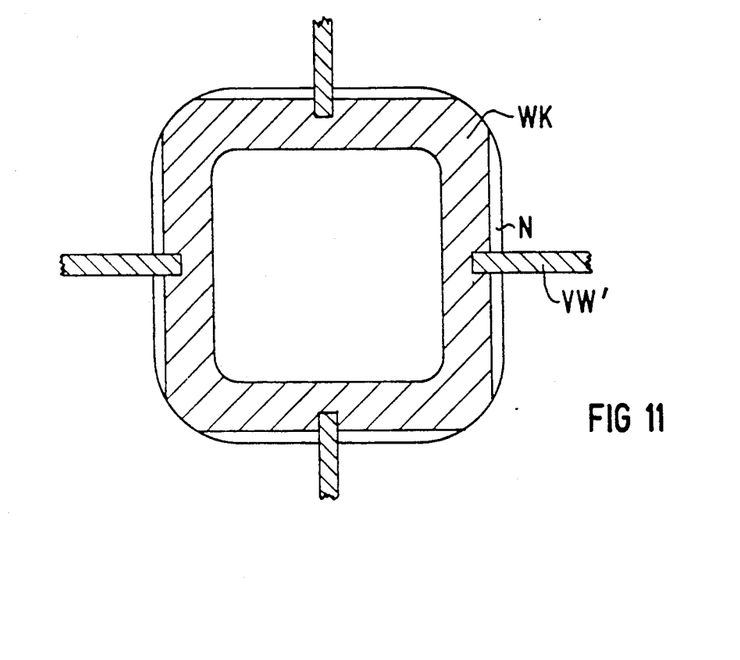
FIGS. 11 and 12 are cross-sectional views of channels constructed according to the invention.
Figure 12:
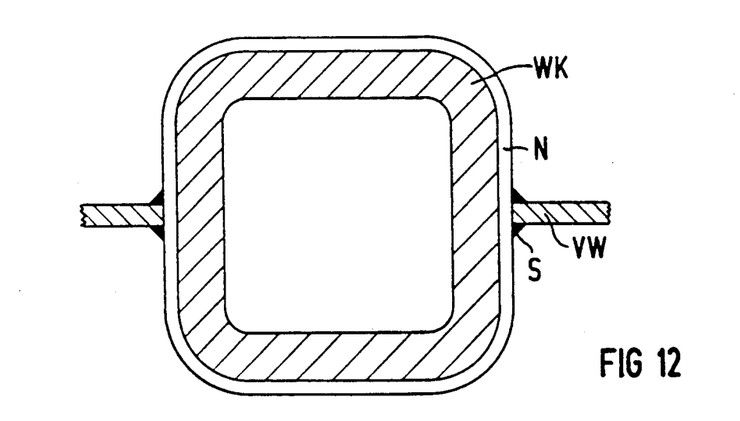

Accordingly, if the upwardly creeping liquid film F strikes the surfaces Nk, it is broken or separated away or detached and is entrained in the form of droplets by the medium flowing past it. This increases the proportion of droplets in the medium, so that correspondingly more droplets are also steered toward the fuel assemblies in the direction of the arrow Tr. The grooves N according to the invention may be made on a tubular wall by turning. In contrast, if an inner wall forming the water channel has planar surfaces, then the grooves may be made in the planar surfaces by milling. This is shown in FIG. 11 for a square channel cross section with rounded corners. If the corners are recessed, milling of the grooves N is easier. However, as FIG. 12 shows, it is also possible for a groove encompassing the entire channel to be milled.

If the channel having the aforementioned reinforcing walls VW'' is joined to the case walls, the reinforcing walls VW'' can be inserted into recesses that are milled into the channel wall and can be welded at that location, as seen in FIG. 11. However, the reinforcing walls VW may also be mounted end-on on the outer surface of the channel and fastened with a welded seam S, for instance. As FIG. 12 shows, in this embodiment the contact between the reinforcing walls VW'' and the channel is interrupted in the vicinity of the groove.

Figure 13A:
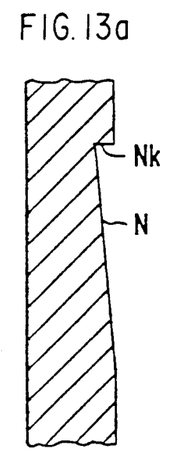
FIGS. 13a–13c are fragmentary, longitudinal-sectional views showing groove shapes on channel walls.
Figure 13B:
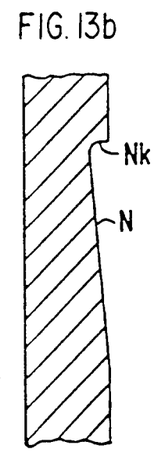
Figure 13C:
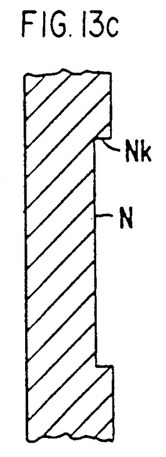
Figure 14A:
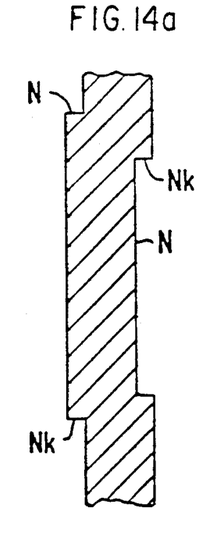
FIGS. 14a–14d are is a group of fragmentary, longitudinal-sectional views showing groove shapes on reinforcing walls.
Figure 14B:
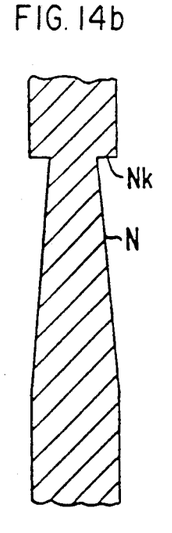
Figure 14C:
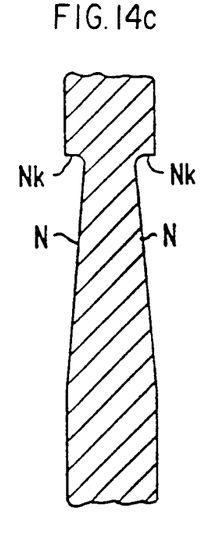
Figure 14D:
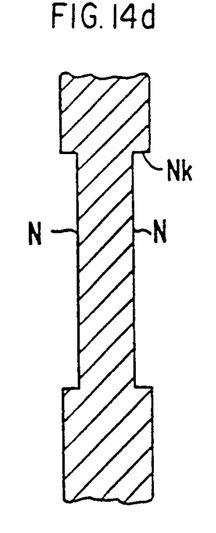

If the inner walls carrying the grooves N are the walls of the aforementioned water rods or water channels, then only the lateral surfaces oriented toward the fuel assemblies have the grooves according to the invention. FIG. 13 shows longitudinal sections through corresponding channel walls with various groove forms. Advantageously, the grooves are formed in such a way that the channel wall tapers steadily in the flow direction until the aforementioned narrow edge surface Nk has been reached. The transition may be made virtually as a right angle, or may be rounded as in the view of FIG. 13b. If the upper groove edge is constructed in this way as a detaching edge, then a speed component aimed at the fuel rods is imparted to the droplets produced upon film detachment, so that more liquid water for boiling is delivered to the fuel rods.

As shown in in FIG. 13c, the lower edge of the grooves may be constructed in this manner as well. Such grooves may be easier to mill and can already cause film detachment to occur at the lower edge. On the other hand, it must be remembered that each edge increases the flow resistance in the fuel assembly.

FIG. 14 shows how corresponding grooves can advantageously be provided on both sides of a reinforcing wall. If the two grooves are each disposed at a given optimal distance ahead of the aforementioned spacers, then they are practically opposite one another. The result is a considerably reduced wall thickness at this point. FIG. 14a shows a particularly easily manufactured embodiment of the reinforcing walls, in which the grooves disposed in the sides are offset from one another, resulting in a virtually constant wall thickness.

Figure 15:
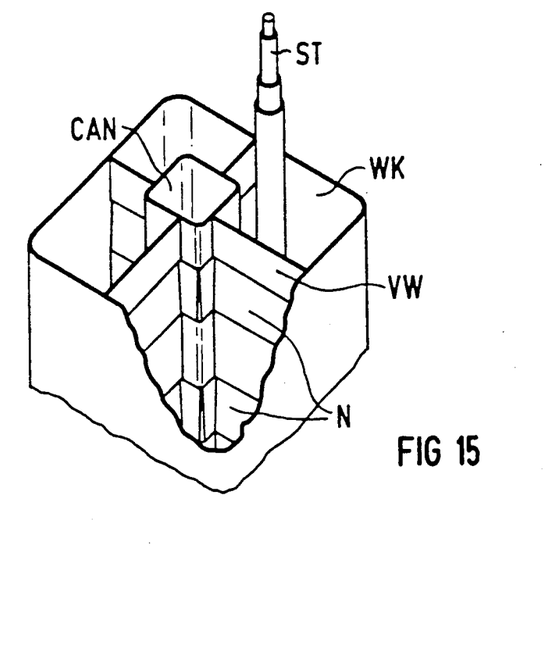
FIGS. 15 and 16 are simplified, fragmentary, perspective views showing details of preferred fuel assemblies.

The groove may already be made in the channel walls and reinforcing walls before these inner walls are joined together to make a corresponding "water structure". The result is a structure that is diagrammatically shown in FIG. 15. The film tripper runs over the lateral surfaces of the reinforcing walls and the remaining free outer surfaces of the channel walls as a continuous groove.

Figure 16:
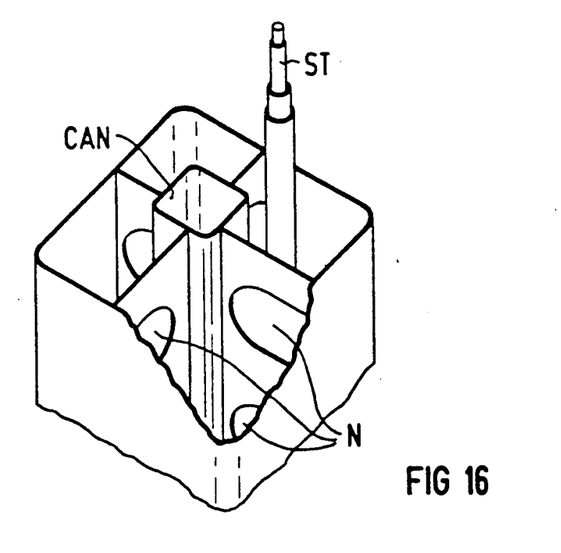

From the standpoint of manufacture, it is often simpler to make the groove non-continuous. In FIG. 16, the side regions of the reinforcing walls are constructed without grooves. As a result of manufacture, the corresponding lateral ends of the grooves may be rounded. In some instances, it may be unnecessary to provide grooves in the walls of the water channel as well.

Naturally, it is also possible for the inner surfaces of the case to be provided with corresponding grooves.

Thus while the inner walls make it possible to provide smaller wall thicknesses of the case walls by reinforcing the case, and/or the neutron flow may be improved by forming a water channel for non-boiling water, the grooves according to the invention make it possible to avoid problematic film formation at such inner walls, and to increase the delivery of coolant to the rods, above all in the upper region, where the steam being formed lessens the cooling of the fuel rods. The fuel assembly according to the invention can therefore be constructed for increased boiling capacity or output.

We claim:

1. Fuel assembly for a boiling water reactor, comprising an elongated fuel assembly case having an interior, mutually parallel fuel rods having longitudinal axes and being disposed in said case, and inner walls disposed in said fuel assembly case and extending longitudinally through the interior of said case and having lateral surfaces facing toward said fuel rods, at least some of said internal surfaces having grooves formed therein extending perpendicular to the longitudinal axes of said fuel rods.

2. Fuel assembly according to claim 1, wherein said inner walls form at least one water channel for non-boiling water being laterally closed off from said fuel rods.

3. Fuel assembly according to claim 2, wherein said grooves extend continuously around the outside of said water channel.

4. Fuel assembly according to claim 2, wherein said lateral surfaces with said grooves are planar outer surfaces of said water channel.

5. Fuel assembly according to claim 1, wherein said case has mutually opposite walls, a plurality of said inner walls interconnect at least two of said mutually opposite walls, and said inner walls each have two of said lateral surfaces in which said grooves are formed.

6. Fuel assembly according to claim 5, wherein said inner walls have sides being parallel to the longitudinal axes of said fuel rods, and said grooves formed in one of said lateral surfaces each extend as far as said sides of said inner walls.

7. Fuel assembly according to claim 5, wherein said inner walls have sides being parallel to the longitudinal axes of said fuel rods, and said grooves formed in one of said inner walls end in a rounded portion at a distance from said sides of said inner walls.

8. Fuel assembly according to claim 1, wherein said case has a polygonal cross section and oppositely disposed side walls, a plurality of said inner walls are parallel to said oppositely disposed side walls of said case, each of said inner walls interconnect two respective oppositely disposed side walls of said case, and said grooves are formed in all of said lateral surfaces facing toward said fuel rods.

9. Fuel assembly according to claim 8, wherein said polygonal cross section is a square cross section.

10. Fuel assembly according to claim 1, wherein said case has a regular polygonal cross section and side walls, said inner walls include a first group of inner walls forming a water channel for non-boiling water extending at least approximately centrally in said case and being laterally closed off from said fuel rods, and a second group of inner walls connecting each of said side walls of said case to said water channel, and at least said second group of inner walls has said grooves formed in all of said surfaces facing toward said fuel rods.

11. Fuel assembly according to claim 10, wherein said regular polygonal cross section is a square cross section.

12. Fuel assembly according to claim 1, wherein said grooves have narrow sides perpendicular to the longitudinal axes of said fuel rods.

13. Fuel assembly according to claim 1, wherein said case has a lower end with a base having inlet openings for boiling water, an upper portion with a top part having outlet openings for boiling water, and a plurality of spacers being longitudinally spaced apart from one another and having ribs between said fuel rods extending transversely to the longitudinal axes of said fuel rods, said grooves being formed only said upper portion and each of said grooves being upstream of a respective one of said spacers, as seen in flow direction of boiling water.

14. Fuel assembly according to claim 1, wherein said inner walls extend longitudinally between said fuel rods.

15. Boiling water reactor, comprising a boiling water circuit having a pressure vessel and a steam turbine, and a plurality of mutually parallel fuel assemblies disposed in said pressure vessel, each of said fuel assemblies including an elongated fuel assembly case, mutually parallel fuel rods having longitudinal axes and being disposed in said case, and longitudinally extending inner walls having lateral surfaces facing toward said fuel rods, at least some of said lateral surfaces having grooves formed therein extending perpendicular to the longitudinal axes of said fuel rods, and said fuel rods being bathed by boiling water flowing around them in the longitudinal direction of said fuel rods.

* * * * *